Figure 1:
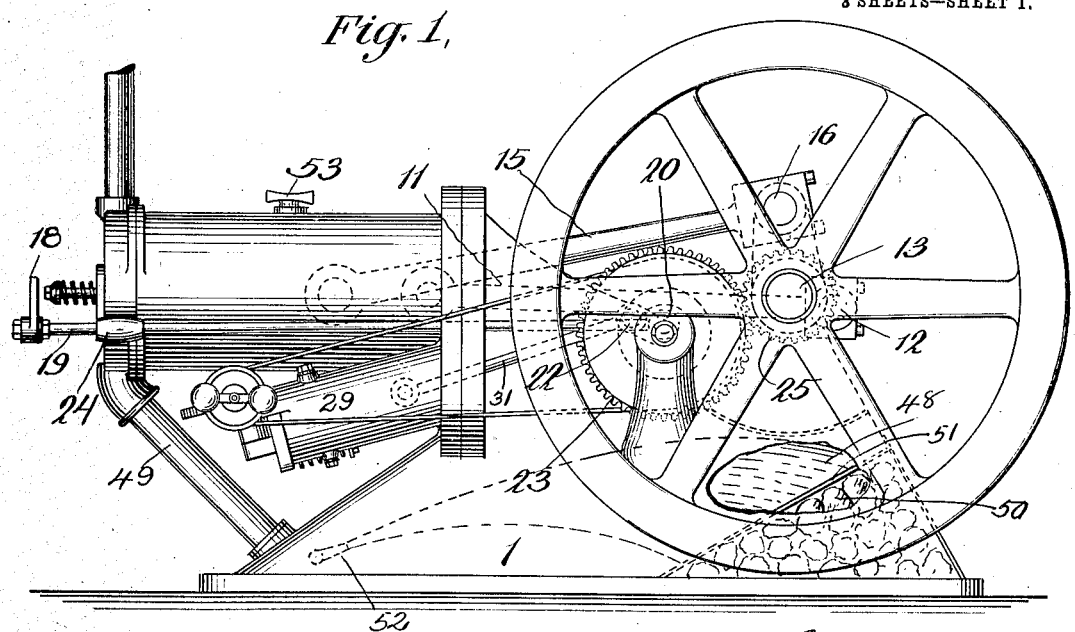

No. 870,720. PATENTED NOV. 12, 1907.
A. J. FRITH.
INTERNAL COMBUSTION ENGINE.
APPLICATION FILED APR. 17, 1905.

3 SHEETS—SHEET 1.

WITNESSES:

INVENTOR
Arthur J. Frith
BY
Chas. J. Earll
ATTORNEY

No. 870,720. PATENTED NOV. 12, 1907.
A. J. FRITH.
INTERNAL COMBUSTION ENGINE.
APPLICATION FILED APR. 17, 1905.
3 SHEETS—SHEET 2.
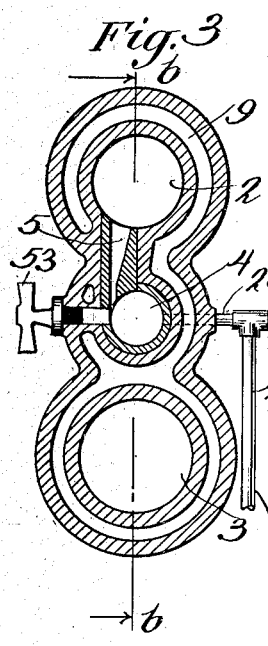
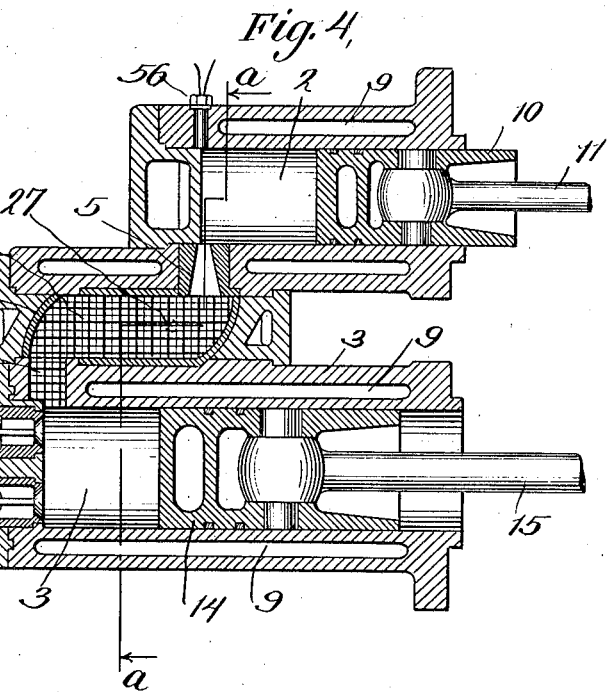
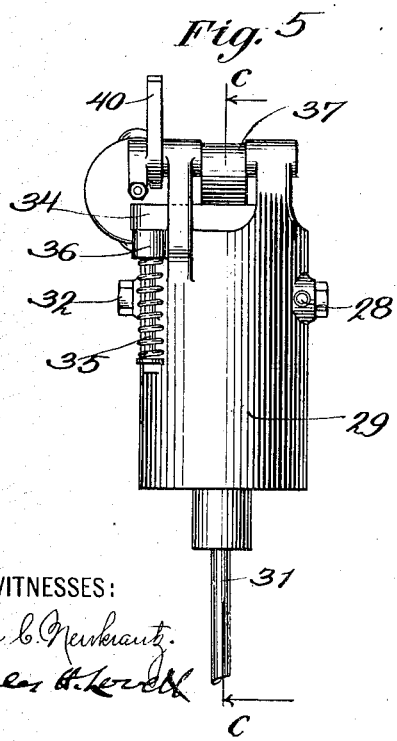
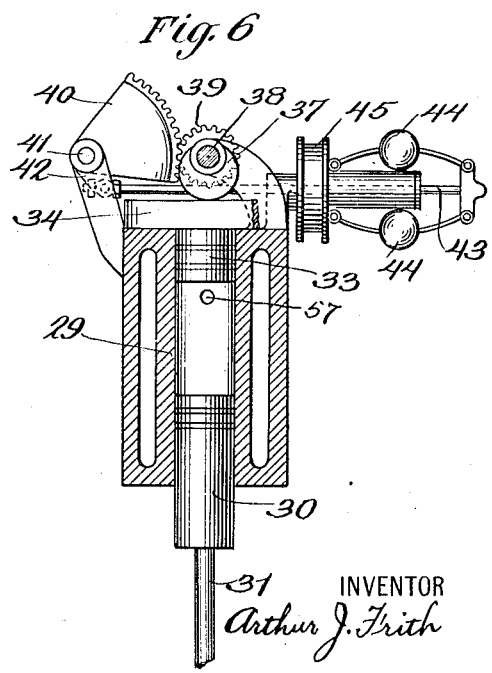
WITNESSES:
Elsie C. Newkrantz
Charles H. Lovell
INVENTOR
Arthur J. Frith
BY
Chas. S. Earl
ATTORNEY No. 870,720. PATENTED NOV. 12, 1907.
A. J. FRITH.
INTERNAL COMBUSTION ENGINE.
APPLICATION FILED APR. 17, 1905.

3 SHEETS—SHEET 3.

WITNESSES:

INVENTOR
Arthur J. Frith
BY
ATTORNEY

UNITED STATES PATENT OFFICE.

ARTHUR J. FRITH, OF NEW YORK, N. Y.

INTERNAL-COMBUSTION ENGINE.

No. 870,720.   Specification of Letters Patent.   Patented Nov. 12, 1907.

Application filed April 17, 1905. Serial No. 255,861.

*To all whom it may concern:*

Be it known that I, ARTHUR J. FRITH, a citizen of the United States of America, and resident of the city of New York, State of New York, have invented certain new and useful Improvements in Internal-Combustion Engines, of which the following is a specification.

My invention relates to internal combustion engines in which oil, gas or other fuel is caused to burn in a closed cylinder and by its action against a movable piston converts heat energy into work.

The object of my invention is to produce an engine of this class which shall be simple and effective in its construction and operation and especially one in which the energy wasted in the escape of gases and through water cooling shall be materially reduced.

My invention consists in providing means for compressing a charge and raising its temperature by means of stored heat, burning the same, converting part of its energy into work, and then abstracting and storing some of its heat, and finally converting more of its energy into work as hereinafter described and pointed out in the claims.

In carrying out the preferred form of my invention, I provide a pair of cylinders of unequal size and connect the working ends of these cylinders with an apparatus, which I will refer to hereinafter as a regenerator, capable of conducting gases from one cylinder to the other and of storing up and giving out heat of said gases, and I provide pistons to operate in said cylinders which are so connected that during a cycle of operations a charge containing air is received into the larger cylinder, compressed therein, passed through the regenerator into the smaller cylinder in a compressed and heated condition where it is caused to burn, allowed to expand, then passed back through the regenerator into the larger cylinder where it still further expands and is then exhausted at a relatively low temperature and pressure.

Figure 2:
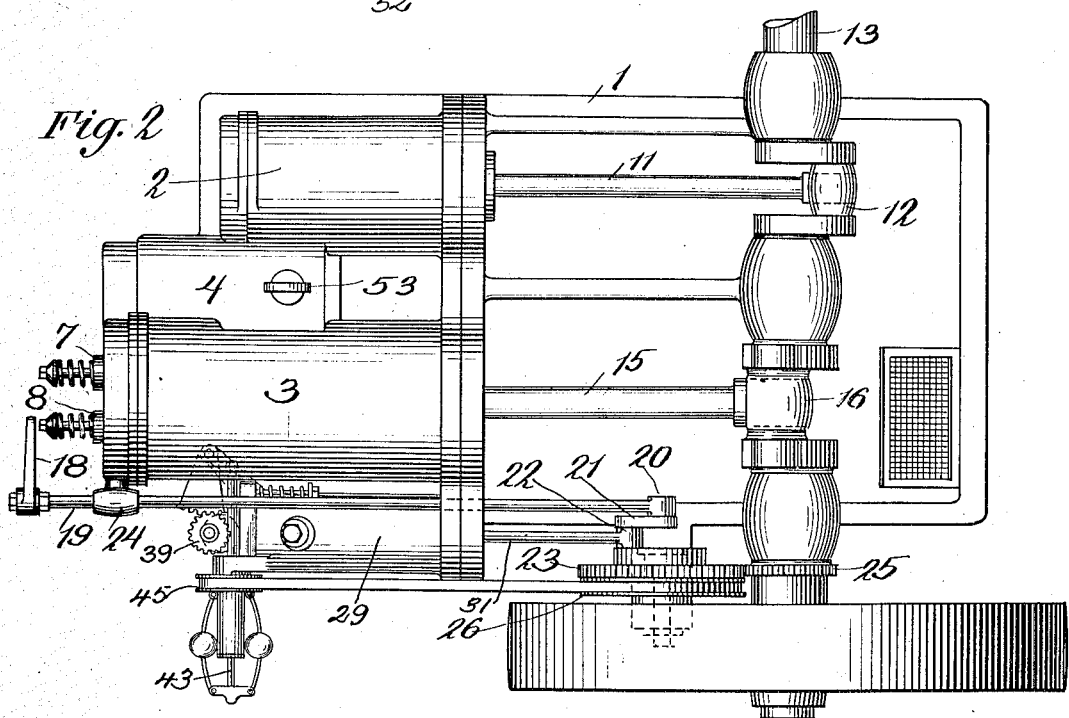
Figure 8:
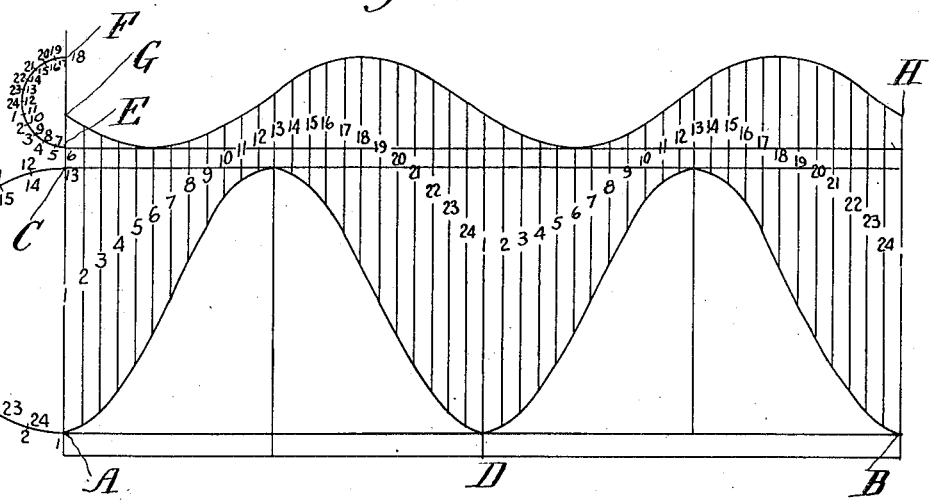
Figure 7:
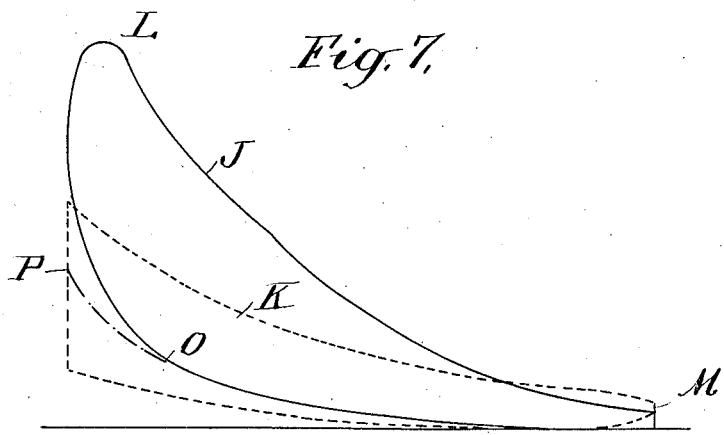

In the drawings accompanying and forming part of this specification Figure 1 is a side view of an engine embodying my invention. Fig. 2 is a plan of the same. Fig. 3 is a cross-section through the cylinders and regenerator on line *a—a* of Fig. 4. Fig. 4 is a section on line *b—b* of Fig. 3. Fig. 5 is a side view of the pump and governor, Fig. 6 a section on line *c—c* of Fig. 5, Fig. 7 is a power diagram, and Fig. 8 is a diagram showing the combined volumes of the cylinders and regenerator for all the varying positions of the cranks.

The reference characters are used in the same sense in the drawings and specification.

Numeral 1 represents a frame of any suitable construction. To this frame are secured the cylinders 2 and 3. The cylinder 2 is a high temperature cylinder and forms a chamber in which combustion takes place. Located between the cylinders 2 and 3 is the regenerator 4 which communicates with the cylinder 2 through the port 5 and with the cylinder 3 through the port 6.

The regenerator may be made of any form and material which is capable of permitting the gases to pass through it and of absorbing or storing up heat, and of withstanding high temperatures.

The cylinder 3 is provided with an inlet valve 7 and an exhaust valve 8 and both of the cylinders are provided with water jackets 9. The regenerator 4 may be insulated in any appropriate manner as by the linings 17 made of appropriate refractory, insulating material, or by other means.

A piston 10 operates in the cylinder 2 and is connected by the connecting rod 11 to the crank pin 12 of the crank shaft 13. The piston 14 operates in the cylinder 3 and is connected by the connecting rod 15 to the crank pin 16. The crank pin 12 is located in advance of the crank pin 16 an appropriate amount to give the proper relative movement to the two pistons 10 and 14. In the engine herein illustrated this angle of advance is about 105 degrees.

The exhaust valve 8 is operated by the tappet 18 mounted on the rod 19 which engages the crank pin 20. The said crank pin 20 is secured to the arm 21 which arm is secured to the pin 22, mounted in the gear wheel 23.

The rod 19 passes through a guide 24 which is pivotally attached to the cylinder. The gear wheel 23 engages a gear 25 on the crank shaft 13, the gear 25 being half the diameter of the former. The gear wheel 23 also has secured to it a belt pulley 26 for the purpose of operating the governor.

Fuel in the form of oil or gas is admitted preferably at some point in the regenerator somewhat nearer the port 5 leading into the cylinder 2, than the port 6 of the cylinder 3 as at 27 through the pipe 28. The pipe 28 is connected with an appropriate pump capable of varying the amount of fuel admitted according to the speed and power requirements of the work performed.

The pump and governor mechanism consist of the cylinder 29 which, when gas is employed, may be water jacketed, in which operates the piston 30. The piston 30 is operated by the rod 31, one end of which engages the crank pin 22 in the gear 23. The pipe 28 leads from an appropriate outlet valve and an inlet valve 32 is connected with any convenient supply of gas or other fuel. The cylinder 29 is opened at both ends, the piston 30 operating in one end as described, while the piston 33 forms an adjustable closure or movable end for the other end of the cylinder.

Attached to the piston 33 outside of the cylinder is a cross bar 34 which is provided with rods 35 passing through the lugs 36. These rods have nuts on their ends and springs mounted on them between said nuts and the lugs 36 which tend to keep the cross bar 34 against said lugs. 37 is an eccentric or cam mounted on the shaft 38 and adapted to bear against the cross bars 34. On one end of the shaft 38 is a gear 39 which engages a segment 40 mounted on the shaft 41, one end of which is secured to the lever 42 which connects with a rod 43 whose movement is controlled by the governor balls 44 in any well-known manner. 45 is a belt wheel operatively connected with the governor balls and adapted to be connected by means of a belt with the belt wheel 26 on the gear 23. During the outward stroke of the piston 30 the springs on the rods 35 will force the piston 33 inwardly until the cross bar 34 banks against the end of the cylinder. The outward movement of the piston 30 will then draw in a charge of fuel through the inlet valve 32, the amount of the charge taken in at each outward stroke of the piston being constant.

During the return or delivery stroke of the piston the inlet valve 32 closes and the piston 33 will move outward until its motion is arrested by the eccentric 37 when the fuel will be forced through the outlet valve into the delivery pipe 28, and into the regenerator 4. Thus the position of the piston 33 at the end of the delivery stroke of piston 30 will be controlled by the governor balls 44, that is, by the speed of the engine, and thus the amount of fuel delivered by each stroke of the pump piston 30 will be controlled by the engine speed.

In order to keep the temperature of the air, during its compression, as low as possible and to approximate as nearly as possible to isothermal compression, I provide means for saturating the air with moisture before compression and before heating the compressed charge by passing it through the regenerator prior to ignition. The addition of moisture to the air during compression to keep the temperature down, has been found to be impracticable heretofore, because it retards or interferes with the burning of the gases, but by means of passing the low temperature compressed charge through the regenerator after its compression has been substantially completed its temperature is raised to a point where the presence of moisture will not interfere with effective burning. By means of this novel arrangement, that is adding moisture to the air before or during compression and raising its temperature after compression and then igniting it, I am enabled to obtain the benefits of substantial isothermal compression without interfering with effective burning. At the same time an additional advantage is obtained in working the regenerator through a wider range of temperatures, for it is obvious that if the temperature of the compressed charge which passes through the regenerator into the combustion cylinder be relatively low, the amount of heat abstracted from the regenerator will be correspondingly greater.

The apparatus for introducing the moisture into the air is constructed as follows:—A chamber 48 is formed in the base of the bed 1 and this chamber is connected by the pipe 49 to the air inlet valve 7. At the further end of this chamber I provide a bed of baffles 50 in front of an open screen 51 through which air is admitted and I provide a jet 52 which is adapted to be connected with a water supply and to direct a jet of water against and upon the baffles 50, the purpose of this construction being to saturate the air with moisture and by a sort of filtering or separating process to clean it from extraneous grit and dust. At the top of the regenerator I place a plug 53 which may be removed to allow the escape of gases when fuel is burned in the regenerator to heat it preparatory to starting. 54 is a valve which controls the communication with a pipe 55 leading from a supply of fuel which is admitted to the regenerator to heat the same preparatory to starting. An electric or other suitable igniter 56 is placed in the cylinder 2 and may be operated in the usual manner to ignite the charge when the heat of the regenerator is insufficient for the purpose.

The operation of the engine herein described is what is known as a four-cycle and is as follows:—Assuming that the engine is running under normal conditions and that the regenerator is at a high temperature and starting at a point when the gases of combustion have been practically all expelled by the inward movement of the piston 14, the succeeding outward movement of the piston 14 will draw in a charge. This charge may be of air, a combustible mixture of fuel and air, or a non-combustible mixture of fuel and air. The next succeeding, or inward, stroke of the piston 14 will compress this charge and force it through the hot regenerator 4 into the cylinder 2, a space being formed therein by the advance movement of its piston. In case the compressed charge is of air or of a non-combustible mixture of fuel and air, a charge of fuel will be introduced into the regenerator during the compression of the charge in the cylinder 3 and preferably after the piston 10 has neared the end of its inward stroke, and when the combined volume of cylinders is approaching its minimum, that is between positions 8 and 11 in Fig. 8. The compressed and heated mixture of fuel and air may ignite during its introduction into cylinder 2 or it may be ignited by the igniter 56 or in any other convenient way. The preheating of the charge will result in greatly increased temperature and pressure in the gases after combustion, and while this high pressure will be exerted equally upon both pistons a greater amount of work will be developed in the smaller cylinder during the first expansion of the gases on account of the advance movement of the smaller piston 10 while the larger piston 14 is at and near the end of its stroke, as will be clearly seen by reference to the diagram Fig. 8. While the fuel is first being swept into the high temperature cylinder 2 it will begin to burn slowly on account of the great excess of fuel. At some time however, before an excess of air is reached the right chemical mixture will be obtained for rapid and explosive combustion. At a certain time during or after the combustion, the piston 14 in the low temperature cylinder will begin its outward movement during which the gases of combustion will return through the regenerator into said cylinder giving up a portion of their heat to the regenerator and expanding from the same high pressure as exists in the high temperature cylinder, but at much lower temperature to the point of exhaust. In this way the temperature and pressure of the exhaust gases and consequently the quantity of heat lost will be much less than that of the best gas engine practice as I understand it. During the succeeding stroke of the piston 14 the gases of combustion are expelled and the cycle is completed. On account of the small area of the high temperature cylinder and the low temperature of the large cylinder the percentage of loss of heat to the cooling water is greatly reduced.

It will be observed that by reason of being able to introduce fuel at the commencement of the outward stroke of the high temperature piston and before the period of maximum compression the fuel can be delivered at moderate pressure on the fuel pump valves and connections and these parts are not subject to the high pressure of maximum compression and the difficulties inherent thereto. The danger of too early an explosion is avoided because the fuel flows into the high temperature cylinder in advance of the delivery of the charge containing air and the mixture at the point of burning is too rich to readily ignite or rapidly burn before the point of maximum compression.

In the diagram, Fig. 8 the curved line A—B represents the movement of the piston 14 during two revolutions. The vertical distance A—C is proportional to the volume of the low temperature cylinder while the horizontal distances are proportional to the number of degrees swept through by the crank, thus A—D represents one revolution or 360 degrees. The distance C—E is proportional to the volume of the regenerator clearance, while the distance E—F is proportional to the volume of the high temperature cylinder. The vertical lines 1, 2, 3, 4, etc. are 15 degrees apart. The length of these lines included between the two curves A—B and G—H represents the total volume for the particular position of the cranks indicated by the position of the lines on the diagram. The high temperature piston is at the inner end of its stroke on line 6 while the low temperature piston reaches the end of its corresponding stroke 105 degrees later, that is on line 13. The point of maximum compression is about on line 12 that is to say, 15 degrees before the low temperature cylinder is at the end of its stroke.

Fuel may be introduced at any point between position 4 and 11 without danger of being forced into the low temperature cylinder.

The regenerator having been preheated as before described, the engine may be started by hand, by compressed air or by an explosive charge especially introduced for the purpose or in any other well-known manner.

In Fig. 7 I have drawn an ideal diagram in full lines designated by J, representing approximately the power diagram of the engine herein described. Upon this diagram I have superimposed in dotted lines a second diagram designated by K representing an ordinary gas engine cycle calling for the same expenditure of heat. The increased pressures represented in diagram J over those of the diagram K, are due to the preheating of the charge and a greater compression before ignition and the greater inclination of the line of expansions L—M is due to the fall of pressure resulting from the absorption of heat by the regenerator as well as the expansion of the gases.

The dotted extension O—P indicates the compression line which would occur provided the gases were not preheated in the regenerator. This greater compression could not be used in the ordinary gas engine without danger of pre-ignition but may be used in my engine, because the air and fuel are kept separate during compression. The relative areas of these diagrams indicate the increased power and efficiency to be obtained by the use of my invention.

Having thus described my invention what I claim is:

1. In an internal combustion engine, the combination with a cylinder and a combustion chamber, of a regenerator in communication with said cylinder and said combustion chamber, means for admitting a charge to said cylinder, a piston in said cylinder, a piston in said combustion chamber, means connecting said pistons for causing them to so move that the charge taken into said cylinder shall be compressed therein and passed in its compressed state through said regenerator into said combustion chamber, expand in said combustion chamber against the piston therein and then be substantially all expelled from said combustion chamber through said regenerator into said cylinder and expand in said cylinder prior to its exhaust therefrom.

2. In an internal combustion engine, the combination with a pair of cylinders of unequal size, each provided with a movable working piston, and the smaller constituting a combustion chamber, of a regenerator connecting said cylinders, an air inlet and an exhaust valve in said larger cylinder, and means for imparting relative movements to said working pistons such that the charge of air taken in shall reach substantially its state of maximum compression prior to its passage through the regenerator into the smaller cylinder from which it shall be returned through the regenerator and reach substantially its state of maximum expansion in the large cylinder prior to its exhaust therefrom.

3. In an internal combustion engine, the combination with a pair of cylinders, each provided with a movable piston, and a regenerator connecting said cylinders, of means for introducing fuel and igniting it, means for operating the pistons to compress air in one of said cylinders, force it through the regenerator into the other cylinder during combustion and causing the gases of combustion to return through the regenerator to the first named cylinder and expand therein.

4. In an internal combustion engine, the combination with a pair of cylinders of unequal size having their working ends connected by a regenerator, a piston in said smaller cylinder, of means for forcing a compressed charge from the larger cylinder through the regenerator into the smaller cylinder after its substantially maximum compression and during combustion, and back through the regenerator into the larger cylinder after combustion and partial expansion and permitting it to expand in said larger cylinder.

5. In an internal combustion engine, the combination of a pair of cylinders having pistons adapted to work therein, one of said cylinders constituting a combustion chamber, of a regenerator in continuously open communication with and connecting the working ends of said cylinders, means for admitting fuel and air, and connections between said pistons causing the volume included between said pistons to periodically increase and decrease and to cause substantially all of the gases of combustion to be expelled from said combustion chamber through said regenerator into said other cylinder during the time when the combined volume of both cylinders increases to its maximum.

6. In an internal combustion engine, the combination with a cylinder, of a regenerator in communication with said cylinder on one side and a combustion chamber on the other side, means for admitting air to said cylinder, compressing it therein and forcing it in its compressed state through said regenerator into said combustion chamber, means for introducing fuel and igniting it, and means for expelling the gases from the combustion chamber after ignition to compel them to return through said regenerator and expand in said cylinder.

7. In an internal combustion engine, the combination with a pair of cylinders, each provided with a movable working piston, one of said cylinders constituting the compression cylinder and the other the combustion chamber, of means for supplying moisture to the charge early in the compression, a regenerator connecting said cylinders, and means for operating said pistons to force the compressed charge through the regenerator into the combustion chamber allowing the gases to partially expand in said combustion chamber, return through said regenerator and further expand in said compression cylinder.

8. In an internal combustion engine, the combination with two cylinders each provided with a piston and in communication with each other through a regenerator, of means for admitting a charge containing air into one of said cylinders, means for operating the piston to compress the charge therein and pass it through the regenerator into said other cylinder for combustion, and means for controlling the relative movements of the pistons in said cylinders so that the maximum displacement of the last named or combustion cylinder shall be less than the original volume of said charge.

9. In an internal combustion engine, the combination with a pair of cylinders connected by a regenerator and provided with working pistons of unequal displacements, the cylinder having the piston of larger displacement being provided with inlet and exhaust valves and constituting the compression cylinder and the other constituting the combustion cylinder, cranks connected with said pistons so related that the charge taken in, compressed and passed through the regenerator into the combustion chamber shall be expelled from said combustion chamber through said regenerator into said compression cylinder while said products of combustion are expanding to their maximum volume.

10. In an internal combustion engine, the combination with a cylinder having a movable piston therein and a regenerator connected therewith, of means for introducing a compressed charge through said regenerator into said cylinder the original volume of which charge exceeds the maximum displacement of said piston, and means for allowing said charge to expand against a second working piston while it is being expelled from said cylinder back through said regenerator.

In testimony whereof, I have signed my name to this specification in the presence of two subscribing witnesses.

ARTHUR J. FRITH.

Witnesses:
ELSIE O. NEWKRANTZ,
GEO. E. HARDY.